Nov. 25, 1941.  P. CROSLEY, JR  2,263,675
MOTOR VEHICLE
Filed July 6, 1939
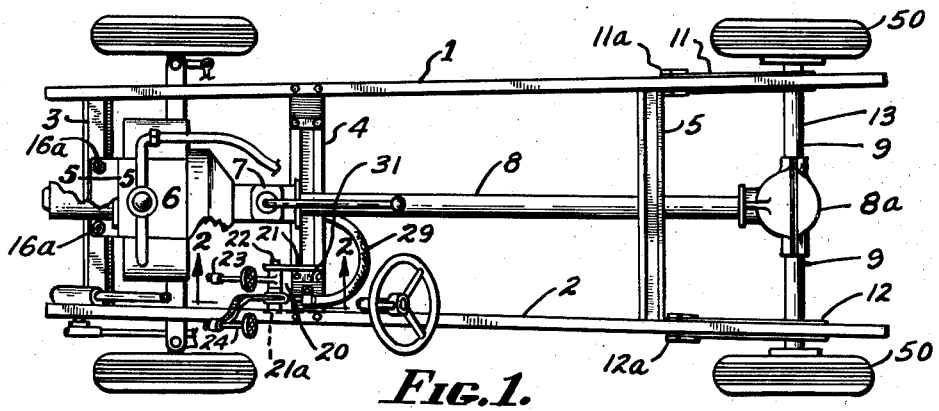
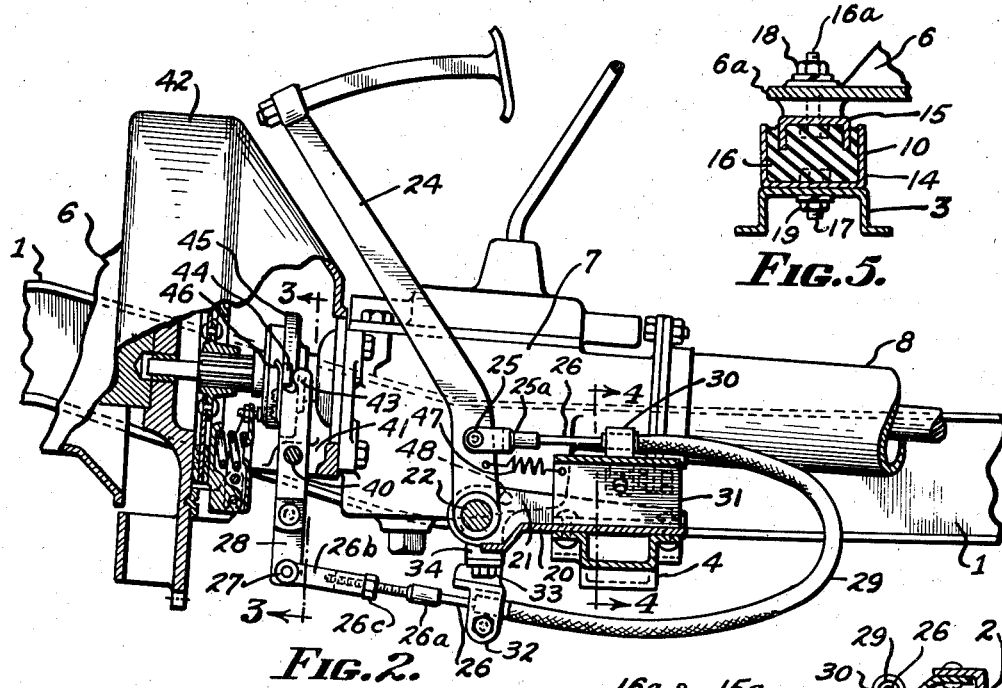
INVENTOR.
POWEL CROSLEY, JR.
BY
ATTORNEYS.

Patented Nov. 25, 1941

2,263,675

UNITED STATES PATENT OFFICE 2,263,675

MOTOR VEHICLE

Powel Crosley, Jr., Cincinnati, Ohio, assignor to The Crosley Corporation, Cincinnati, Ohio, a corporation of Ohio Application July 6, 1939, Serial No. 283,042

2 Claims. (Cl. 180—57)

This invention relates to motor vehicles designed to be as inexpensive to build and operate as possible. It also relates to motor vehicles of a type which at one time formed the basis of a number of suggestions to be found in the art, in which the engine, gear case, torque shaft, and rear axle shafts were bound together in a series of rigid housings, the whole supported at the front of the vehicle by a universal joint between the engine and the frame.

It follows, in a structure of the aforesaid general type, that the operation of the clutch and gear shift, controlled from within the body of the vehicle must be subject to the movement of the gear case of the engine, as the rear wheels of the vehicle move, and so far as I am advised, the structures of this type in the past have been such that the pedals or controls have been mounted directly on the engine structure, and allowed to move about as the engine structure moves about.

It is an object of this invention to remove the clutch pedal from an oscillatory position. The gear shift lever is not pivotally mounted as is a clutch pedal and can be permitted to stand up directly on the gear case. According to my invention the clutch pedal is connected by a flexible shaft to the engine casing, so that the defect of having it oscillate and vibrate with the engine is done away with.

It is also an object of the invention to remove all oscillatory joints between the engine and the vehicle frame where it is supported, and accordingly, there is provided a rubber mount for the engine, constituting its sole juncture with the vehicle frame, which rubber mount is set ahead of the engine, so as to be the least subject to amplitude of movement of any portion of the rigidly connected system of the power plant.

In the drawing an illustrative embodiment which will serve to explain my invention, is shown, and will be described in detail. The novelty inherent therein, is set forth in the appended claims.

In the drawing:

Figure 1 is a plan view of an auto chassis with parts broken away and other parts removed to clarify the features of my invention.

Fig. 2 is a sectional view taken along the line 2—2 of Fig. 1, and also having part of the flywheel housing broken away with certain parts therein shown in section.

Fig. 3 is a section taken on the line 3—3 of Fig. 2.

Fig. 4 is a section taken along line 4—4 of Fig. 2.

Fig. 5 is a section taken along line 5—5 of Fig. 1, and,

Fig. 6 is a perspective of the resilient mounting employed for supporting the motor.

Referring to Fig. 1, the side members 1 and 2 of the chassis are connected by cross members 3, 4 and 5. The drive system, consisting of motor 6; transmission 7; torque tube 8; differential casing 8a and rear axle housings 9 are assembled in rigid relation. It will be understood that the drive shaft, differential, rear axles and wheels 50 may be arranged as desired within their various housings, but that these housings and other members of the drive system above mentioned are bolted, welded, or otherwise secured together in a unitary structure.

At its front end the drive system is attached to the cross member 3 by means of the resilient mounting 10 illustrated in Figs. 5 and 6. Near the rear of the frame members 1 and 2, springs 11 and 12 are affixed in any convenient manner as indicated at 11a and 12a. The springs here illustrated are of the cantilever type and are fixed at their other ends to the axle housing 13. It will be understood that other types of springs, shock absorbers and snubbers may of course be employed without affecting the spirit of my invention.

Referring to Figs. 5 and 6 the resilient mounting 10 is composed of a lower channel member 14 and an upper channel member 15 with a separator or core 16 of rubber or other resilient material interposed therebetween. It is preferred to form the member 10 by molding or vulcanizing the core 16 in assembly with the members 14 and 15 so that an integral structure is formed as seen in Fig. 6.

At either end of the member 15 I provide an unchannelled portion having perforations 15a through which bolts 16a are shown. Likewise the channel 14 is provided with bolts 17. As shown in Fig. 5 the bolts 16a are provided with nuts 18 which engage a flange 6a at the front of the motor securing the member 15 firmly thereto. The bolts 17 extend through perforations in the cross bar 3 and are secured thereto by nuts 19. It will be apparent that other types of resilient mountings could be readily devised and that I am not to be limited to the particular construction here shown.

Fixed to the cross member 4 a plate 20 has upturned side portions 21 and 21a in which a shaft 22 is mounted. Journaled on the shaft 22 is the brake pedal 23 and the clutch pedal 24. As seen in Fig. 2, I have pivotally attached to the clutch pedal as at 25, a clevis 25a which clevis is fixed to the end of the flexible cable 26. The other end of cable 26 is provided with a threaded member 26a, which member engages a clevis 26b. The clevis 26b is pivotally connected by a pin 27 to the clutch fork 28. By reason of the threaded engagement of member 26a and clevis 26b the effective length of the cable 26 may be adjusted, that adjustment being retained by lock nut 26c. The flexible cable 26 operates through a sleeve or housing 29, which housing is of the conventional type and is secured at one end by clamp 30 to an angularly inclined member 31 of the frame. At its other end the cable housing or sleeve 29 is secured by clamp 32, said clamp 32 itself being fixed by screw 33 to a lug or boss 34 on the under side of the transmission case 7.

The clutch fork 28 is mounted on a rod or shaft 40 which shaft is fixed in bosses 41 of the flywheel housing 42. The bifurcated ends of the clutch fork are cut away and formed as at 43 to engage lugs or ears 44 on the clutch collar 45. A strip 46 opposite the portion 43 serves to retain the ears 44 in operative relation with the clutch fork.

The clutch as shown in the drawing is of the conventional type and it will be understood that I am not to be limited to the particular type or construction here illustrated.

In Fig. 2 I have illustrated diagrammatically a spring 47 which may be employed for returning the clutch pedal 24 to the position shown. Also indicated diagrammatically is a stop member 48 for limiting movement of the pedal 24. Various forms of springs and stops may of course be readily substituted for those shown and it will be understood that I am not to be limited to the particular structure or embodiment of my invention as shown throughout the drawing but by what I claim to be new and patentable in the claims which follow.

Having thus described my invention what I claim as new and desire to secure by Letters Patent, is:

1. In a motor vehicle, in combination with front and rear axles and a frame, a power unit comprising, an engine, a transmission housing, a drive shaft housing and a rear axle housing all rigidly interconnected, springs supporting the rear end of the frame upon the rear axle housing and the front end of the frame on the front axle, mounting means for mounting said unit in said frame at the front end thereof, said means comprising a pair of channel members of substantial length disposed transversely of the frame, one of said channel members being secured to said unit and one to said frame, and a resilient member secured between said channel members.

2. In a motor vehicle, in combination with front and rear axles and a frame, a power unit comprising, an engine, a transmission housing, a drive shaft housing and a rear axle housing all rigidly interconnected, springs supporting the rear end of the frame upon the rear axle housing and the front end of the frame on the front axle, mounting means for mounting said unit in said frame at the front end thereof, said means comprising a pair of channel members of U-shaped cross section and of substantial length disposed transversely of the frame, one of said channel members being secured to said unit and one to said frame, and a resilient member disposed within one of said channel members the sides of the other channel member being embedded therein.

POWEL CROSLEY, Jr.